(12) United States Patent
King (10) Patent No.: US 11,086,628 B2
(45) Date of Patent: Aug. 10, 2021

(54) SYSTEM AND METHOD FOR LOAD AND STORE QUEUE ALLOCATIONS AT ADDRESS GENERATION TIME

(71) Applicant: Advanced Micro Devices, Inc., Sunnyvale, CA (US)

(72) Inventor: John M. King, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 475 days.

(21) Appl. No.: 15/236,882

(22) Filed: Aug. 15, 2016

(65) Prior Publication Data

US 2018/0046463 A1 Feb. 15, 2018

(51) Int. Cl.
| G06F 9/312 | (2018.01) |
| G06F 9/32 | (2018.01) |
| G06F 9/38 | (2018.01) |
| G06F 9/30 | (2018.01) |
| G06F 9/48 | (2006.01) |

(52) U.S. Cl.
CPC ........ *G06F 9/3802* (2013.01); *G06F 9/30043* (2013.01); *G06F 9/384* (2013.01); *G06F 9/3824* (2013.01); *G06F 9/3834* (2013.01); *G06F 9/3836* (2013.01); *G06F 9/3855* (2013.01); *G06F 9/3857* (2013.01); *G06F 9/4881* (2013.01)

(58) Field of Classification Search
CPC .. G06F 9/3802; G06F 9/30043; G06F 9/3824; G06F 9/3834; G06F 9/3836; G06F 9/384; G06F 9/3855; G06F 9/3857; G06F 9/4881

USPC ......... 712/205–207, 216–219, 225
See application file for complete search history.

(56) References Cited

U.S. PATENT DOCUMENTS 5,745,726 A * 4/1998 Shebanow ............ G06F 9/3836
                                                       712/214
6,481,251 B1 11/2002 Meier et al.
(Continued)

FOREIGN PATENT DOCUMENTS

WO 2016113105 A1 7/2016

OTHER PUBLICATIONS

Sethumadhavan, S. et al., "Late-Binding: Enabling Unordered Load-Store Queues", Proceedings of the 34th Annual International Symposium on Computer Architecture, Jun. 9-13, 2007, pp. 347-357, ACM, San Diego, CA, USA.

*Primary Examiner* — Daniel H Pan
(74) *Attorney, Agent, or Firm* — Volpe Koenig (57) ABSTRACT

A system and method for load queue (LDQ) and store queue (STQ) entry allocations at address generation time that maintains age-order of instructions is described. In particular, writing LDQ and STQ entries are delayed until address generation time. This allows the load and store operations to dispatch, and younger operations (which may not be store and load operations) to also dispatch and execute their instructions. The address generation of the load or store operation is held at an address generation scheduler queue (AGSQ) until a load or store queue entry is available for the operation. The tracking of load queue entries or store queue entries is effectively being done in the AGSQ instead of at the decode engine. The LDQ and STQ depth is not visible from a decode engine's perspective, and increases the effective processing and queue depth.

23 Claims, 5 Drawing Sheets

(56) References Cited

U.S. PATENT DOCUMENTS

| | | | |
|---|---|---|---|
| 7,782,885 B1* | 8/2010 | Sabato | H04L 47/22 370/389 |
| 9,367,322 B1 | 6/2016 | Brownscheidle et al. | |
| 2003/0182537 A1 | 9/2003 | Le et al. | |
| 2008/0320478 A1* | 12/2008 | Singh | G06F 9/3836 718/102 |
| 2012/0278685 A1 | 11/2012 | Gunna et al. | |
| 2012/0291037 A1 | 11/2012 | Venkataramanan et al. | |
| 2014/0351562 A1* | 11/2014 | Spadini | G06F 9/3836 712/214 |
| 2015/0095618 A1 | 4/2015 | Abdallah | |
| 2015/0106595 A1* | 4/2015 | Khot | G06F 9/3836 712/215 |
| 2015/0205605 A1* | 7/2015 | Abdallah | G06F 9/30043 711/145 |

* cited by examiner

SYSTEM AND METHOD FOR LOAD AND STORE QUEUE ALLOCATIONS AT ADDRESS GENERATION TIME

BACKGROUND

A processor generally has associated with it an instruction pipeline which includes fetching, decoding (or dispatching) and executing stages. The decoding stage retrieves an instruction from a fetch queue and allocates entries in load queues (LDQs) or store queues (STQs). The LDQ and STQ resources are structures whose depth (i.e., number of entries that can be stored in the queue) and queue lifetime impact the performance of the processor. Although deeper LDQs and STQs enable a higher number of instructions per clock (IPC), at some point deeper LDQs and STQs cause timing problems. The LDQ and STQ entries are normally allocated at instruction dispatch. If a load or store operation is at the dispatch point but the LDQs and STQs are full, dispatch is stalled until LDQ and STQ entries are deallocated. This means that the LDQ and STQ depth is a limiter for the effective window size of the processor, i.e., it is a restriction on the number of instructions that can be processed at one time.

BRIEF DESCRIPTION OF THE DRAWINGS

A more detailed understanding may be had from the following description, given by way of example in conjunction with the accompanying drawings wherein.

DETAILED DESCRIPTION

Processors generally operate pursuant to an instruction pipeline which includes fetching, decoding (or dispatching) and executing stages. The decoding or dispatching stage retrieves an instruction from a fetch queue and allocates entries in load queues (LDQs) or store queues (STQs). The LDQ and STQ entries are normally allocated at instruction dispatch. If a load or store operation is at the dispatch point but the LDQs or STQs are full, dispatch is stalled until LDQ or STQ entries are deallocated. This means that the LDQ and STQ depth is a limiter for the effective window size of the processor.

A system and method for LDQ and STQ entry allocations at address generation time that maintains an age-order of instructions is described. In particular, writing LDQ and STQ entries are delayed until address generation time. This allows the load and store operations to dispatch, and younger operations (which may not be store and load operations) to also dispatch and get their instructions started or completed. The address generation of the load or store operation is held pending in an address generation scheduler queue (AGSQ) until a load queue entry or a store queue entry is available for the operation. The tracking of LDQ entries or STQ entries is effectively being done in the AGSQ instead of at the dispatch point (i.e., at the decode engine). As everything is pushed down to the AGSQ, the LDQ and STQ depth is not visible from a decode engine's perspective, and increases the effective depth as described herein below.

Figure 1:
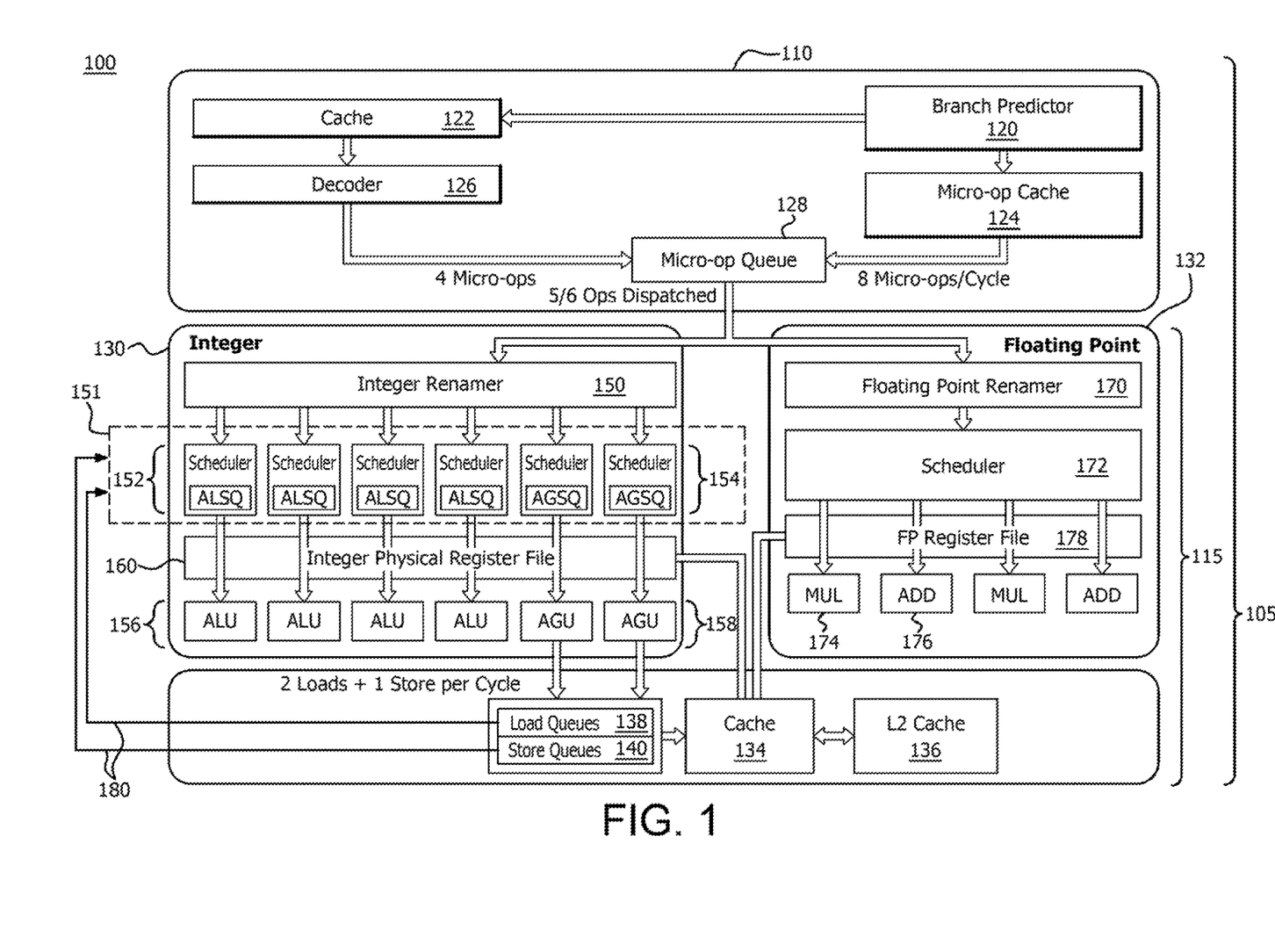
FIG. 1 is a high level block and flow diagram of a core processing unit of a processor in accordance with certain implementations.

FIG. 1 is a high level block and flow diagram of a core processing unit 105 of a processor 100 in accordance with certain implementations. The core processing unit 105 includes a decoder unit 110 which provides micro operations (micro-ops) to a scheduler and execution unit (SCEX) 115. The decoder unit 110 includes a branch predictor 120 connected to a cache 122 and a micro-op cache 124. The cache 122 is further connected to a decoder 126. The decoder 126 and the micro-op cache 124 are connected to a micro-op queue 128.

The SCEX 115 includes an integer SCEX 130 and a floating point SCEX 132, both of which are connected to a cache 134. The cache 134 is further connected to a L2 cache 136, LDQs 138 and STQs 140. The integer SCEX 130 includes an integer renamer 150 which is connected to a scheduler 151, which includes arithmetic logic unit (ALU) scheduler queues (ALSQs) 152 and address generation (AGU) scheduler queues (AGSQs) 154. The scheduler 151, and in particular the ALSQs 152 and AGSQs 154, are further connected to ALUs 156 and AGUs 158, respectively. The integer SCEX 130 also includes an integer physical file register 160. The floating point SCEX 132 includes a floating point renamer 170, which is connected to a scheduler 172. The scheduler 172 is further connected to multipliers 174 and adders 176. The floating point SCEX 132 also includes a floating point physical file register 178.

A pipelined processor requires a steady stream of instructions to be fed into the pipeline. The branch predictor 120 predicts which set of micro-ops are fetched and executed in the pipelined processor. These micro-ops are fetched and stored in cache 122, which in turn are decoded by the decoder 126. The micro-op cache 124 caches the micro-ops from the branch predictor 120 as the decoder 126 decodes the micro-ops from the cache 122. The micro-op queue 128 stores and queues up the micro-ops from the decoder 126 and micro-op cache 124 for purposes of dispatching the micro-ops for execution.

In conventional pipeline processing, a micro-op queue dispatches the micro-ops to a load queue or a store queue to store the payloads associated with the micro-ops. For purposes of illustration, the store queue could accept six micro-ops, of which four can be store micro-ops, from the micro-op queue and write the dispatch payload into the store queue at dispatch time. At address generation time, the store queue then receives a queue entry number from a scheduler to specify which store queue entry is being processed. The scheduler reads out the dispatch payload, and sends it to segmentation logic for segmentation checks, and to a load queue for a possible pick on the micro-op pipes. That is, conventional pipeline processing is a two-pass write process with respect to the store and load queues; once at dispatch for the payload and again at address generation to generate the address.

Physically, this is difficult for a number of reasons. First, the architecture needs to support the full width of the micro-op queue. For example, writing six micro-ops (including the four store micro-ops) at dispatch requires a lot of wires and multiplexors and causes congestion in the area of the store queue that holds the dispatch payload. Second, reading the payload at address generation time requires undertaking a difficult set of paths (i.e., timing paths), including sending the queue entry number from the address generation unit to the store queue, reading the payload out, and sending the payload to the segmentation logic and load queue. Since the store queue holds the dispatch payload, this means that the store queue entry is occupied starting at dispatch, even though nothing can be done with the store micro-op until address generation. Consequently, the architecture necessary for the micro-op width is being wasted. That is, the depth of the store and load queues limit the window of the processor (i.e., there is a restriction on the number of operations that can be processed at one time).

In accordance with an implementation, the micro-ops are dispatched to the integer SCEX 130 and the floating point SCEX 132 only, instead of directly writing to the LDQs 138 and STQs 140 as per the conventional pipeline processing. In particular, the micro-ops are directed to: 1) the scheduler 151 via the integer renamer 150; and 2) the scheduler 172 via the floating point renamer 170. The scheduler 151 holds onto all of the dispatch payloads for the micro-ops, e.g., the dispatch payloads for the load and store micro-ops, in the AGSQ 154. The AGSQ 154 holds the dispatch payloads for the micro-ops, e.g., the load and store micro-ops, until a particular queue entry in the appropriate LDQs 138 or STQs 140 is available. Once a queue entry is available and the source information is ready, the AGSQ 154 generates the address, reads the dispatch payload and sends the dispatch payload to the LDQs 138 or STQs 140.

In order to maintain age-ordered operation or in-order queues, every store micro-op is associated with a particular store queue entry or queue identifier. That store queue entry is assigned to the store micro-op at dispatch in program order (e.g., a store micro-op might be assigned to store queue entry 0, and the next store micro-op in the program order would be assigned to store queue entry 1, the next store micro-op in the program order would be assigned to store queue entry 2, and so on). This keeps the store micro-ops in order in the store queue by queue entry number or position. An ordered-by-position store queue is a straightforward way to process store micro-ops and is known to those skilled in the art. The present implementation retains that in-order property and assignment of a queue entry at dispatch, without requiring the store queue entry to be available to the micro-op at dispatch.

The assignment of the store queue entry at dispatch time allows the AGSQ and ALSQ to easily determine when a store queue entry is free by comparing the oldest uncommitted store micro-op's store queue entry number to the store queue entry of the store micro-ops in the AGSQ and ALSQ. In particular, the scheduler 151 needs to know when the AGSQ 154 can perform address generation and send the dispatch payload to the STQ 140 and when the ALSQ 152 can send the store data to the STQ 140. Accordingly, a particular queue entry is communicated by the STQ 140 to the AGSQ 154 and ALSQ 152 when the particular queue entry is available. This is further described below with respect to output 180 in FIG. 1.

In particular, the LDQs 138 and STQs 140 send the scheduler 151 (e.g., AGSQ 154 and ALSQ 152) a commit-deallocation signal so that the scheduler 151 (e.g., AGSQ 154 and ALSQ 152) can update its oldest uncommitted store micro-op store queue entry number to enable address generation, sending of the dispatch payload and sending of store data for younger store micro-ops as those older store micro-ops deallocate and free up their respective store queue entries. This is implemented, for example, by adding an output 180 from the LDQs 138 and STQs 140 to an input at the scheduler 151 (e.g., AGSQ 154 and ALSQ 152).

As the scheduler 151 knows the store queue entry number for each store micro-op in the AGSQ 154 and for each store data micro-op in the ALSQ 152, and the scheduler 151 also knows what the oldest uncommitted store micro-op's store queue entry number is (plus wrap bit(s)), the scheduler 151 is able to determine the appropriate micro-ops whose queue entry is available. For example, if the store queue entry number of an AGSQ 154 entry or ALSQ 152 entry is within a store queue depth (XC_STQDEPTH) of the oldest uncommitted store micro-op's queue entry (considering wrap bits properly), then address generation for the store micro-op can proceed or the store micro-op dispatch payload can be sent, since the store micro-op's store queue entry is available for that store micro-op (assuming that the appropriate source information or source operands are also ready). Any store micro-ops younger than the store micro-op that is XC_STQDEPTH-1 stores younger that the oldest store micro-op cannot be allowed to perform address generation, send dispatch payload or send store data and is considered not-ready for micro-op picking, i.e., executing the store micro-op, because their store queue entries are still occupied by older store micro-ops.

By holding all dispatch payload in the AGSQ 154 and delaying store queue allocation until address generation time, more store micro-ops can be dispatched than the store queue size (e.g., size of store queue 140). By eliminating the source of dispatch stalls, further micro-ops can be introduced in the window and allowed to start execution. That is, although some store micro-ops will not be able to get started until the previous store micro-op in their store queue entry deallocates, other micro-ops can proceed. Importantly, loads that are cache misses can dispatch and perform address generation and get their cache miss started.

Support for handling a greater number of store micro-ops in the window than there are store queue entries necessitates a mechanism for comparing the age of these micro-ops. The mechanism for comparing the age is provided by using the store queue entry number associated with the store micro-op as well as the "wrap" bits that accompany the store queue entry number. The wrap bits determine which "epoch" of the store queue entry the associated store micro-ops will use. Each "epoch" represents a different version or cycle of the store queue. A single wrap bit provides a means for tracking two different "wraps" or "epochs" of the store queue, which enables dispatching the full store queue (XC_STQDEPTH). When more store micro-ops are allowed to dispatch than store queue entries, there can be micro-ops in the window with the same store queue entry, but from multiple different "wraps" or "epochs" of the store queue. One additional wrap bit, for a total of two wrap bits, provides a means for tracking four different "wraps" or "epochs" of the store queue, which enables dispatching up to three times the store queue depth.

In an illustrative example, if the implemented architecture has a store queue depth of 44 and there are two 14-entry AGSQs (for up to 28 additional micro-op stores at address generation), then there are a total of 72 stores that are able to be dispatched in the window. Accordingly, the processor does not dispatch more than twice the store queue depth and two wrap bits are used to track and compare the age of all 72 store micro-ops in the processor, and no dispatch stall is necessary. The wrap bits are computed at dispatch and are part of the dispatch payload that is held in the AGSQ. If the AGSQ scheduler depth allows dispatching of store micro-ops more than three times the store queue depth, additional wrap bits can be added to enable dispatching an arbitrary number of store micro-ops.

The load micro-ops are not necessarily age-ordered and use other techniques known to those skilled in the art. In an implementation, the load micro-ops operate similarly to the store micro-ops.

From an architecture perspective, the implementations described herein solve the issues outlined above. First, the number of dispatch payload write ports is reduced in the store queue. For example, the number of dispatch payload write ports are reduced from four (four stores per cycle at dispatch) to two (two store address generations per cycle). Second, difficult timing paths are eliminated. For example, the timing paths which involve sending the queue entry number to the store queue, reading out the payload and then sending the payload to the segmentation logic and load queue are eliminated.

Once address generation is performed by the AGSQs 154 and the dispatch payload are stored in the LDQs 138 and STQs 140 as needed, the core processing unit 105 executes the micro-ops accordingly. The LDQs 138 and STQs 140 return data for the load micro-ops and performs writes for store micro-ops, respectively, and the scheduler 151 and the scheduler 172 issue micro-ops to the integer SCEX 130 and floating-point SCEX 132 as their respective source information becomes ready.

Figure 2:
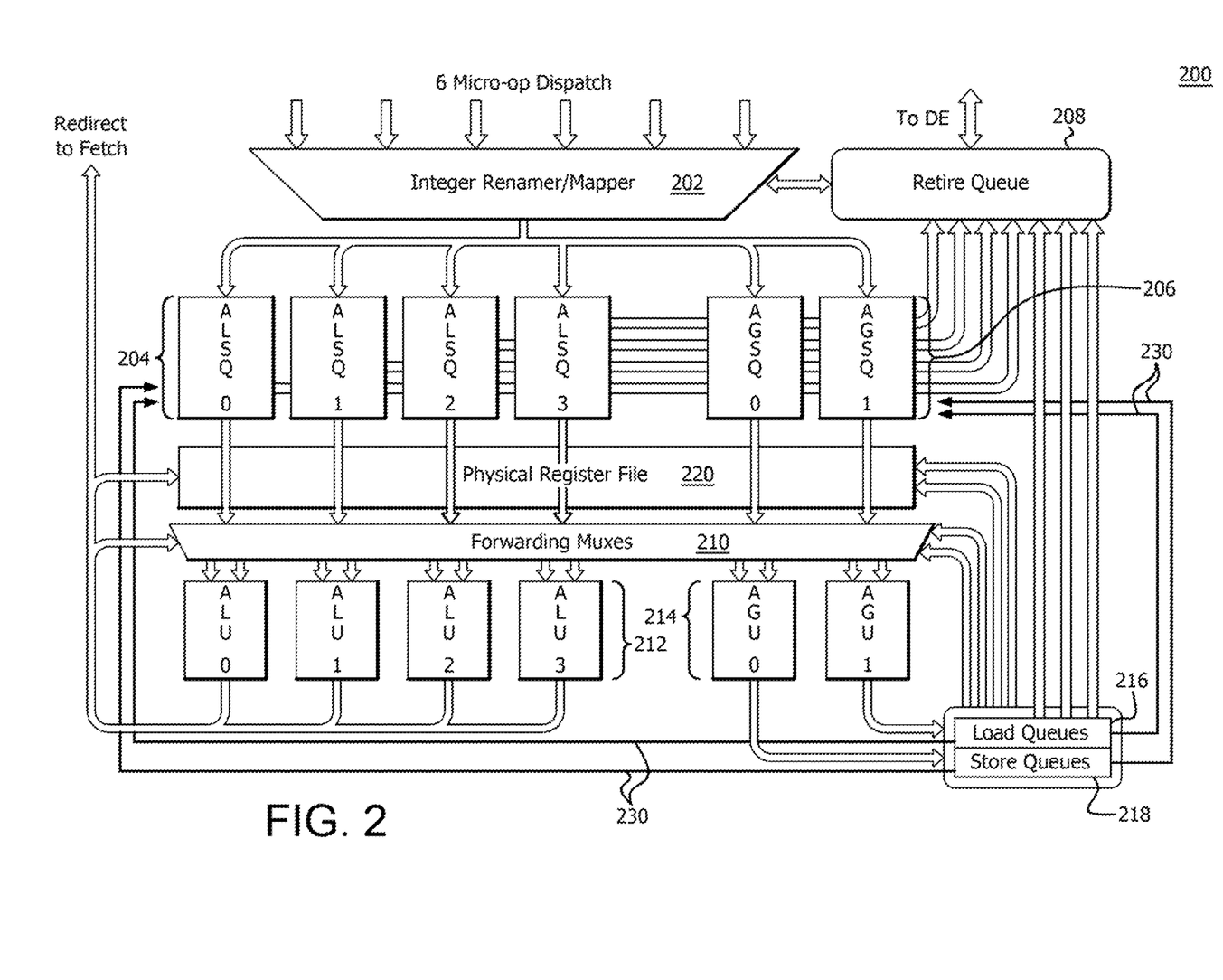
FIG. 2 is a high level block and flow diagram of an integer scheduler and/or execution unit in accordance with certain implementations.

FIG. 2 is a high level block diagram of an integer scheduler/execution unit 200 in accordance with certain implementations. The integer scheduler/execution unit 200 includes an integer renamer/mapper 202 which is connected to ALSQs 204, AGSQs 206 and a retire queue 208. The ALSQs 204 and AGSQs 206 are further connected to forwarding multiplexors 210, which in turn are connected to ALUs 212 and AGUs 214, respectively. The AGUs 214 are connected to LDQs 216 and STQs 218. The integer scheduler/execution unit 200 also includes a physical file register 220.

Similar to FIG. 1, micro-ops are dispatched to the AGSQs 206 only and not to the LDQs 216 and STQs 218. The AGSQs 206 hold the dispatch payload until the required source information and an appropriate load queue or store queue entry is available. In particular, the AGSQs 206 perform address generation for a particular load or store micro-op when the required source information is ready and the load queue entry or store queue entry for the particular micro-op is available in the LDQs 216 and STQs 218, respectively. This maintains age-order execution of the micro-ops. The AGSQs 206 and ALSQs 204 are informed by the LDQs 216 and STQs 218 when a particular queue entry is available by signaling the AGSQs 206 and ALSQs 204 via an output signal 230 from the LDQs 216 or STQs 218, respectively. The store-data micro-ops in the ALSQs 204 execute and provide store data to the store queue entry only once the store queue entry for the particular store micro-op is available.

Once address generation is performed by the AGSQs 206 and the dispatch payload are held in the LDQs 216 and STQs 218 as needed, the integer SCEX 200 executes the micro-ops. The LDQs 216 and STQs 218 return data for the load micro-ops and perform writes for store micro-ops, respectively, and a scheduler issues micro-ops to the integer SCEX 200 as their source information becomes ready.

Figure 3:
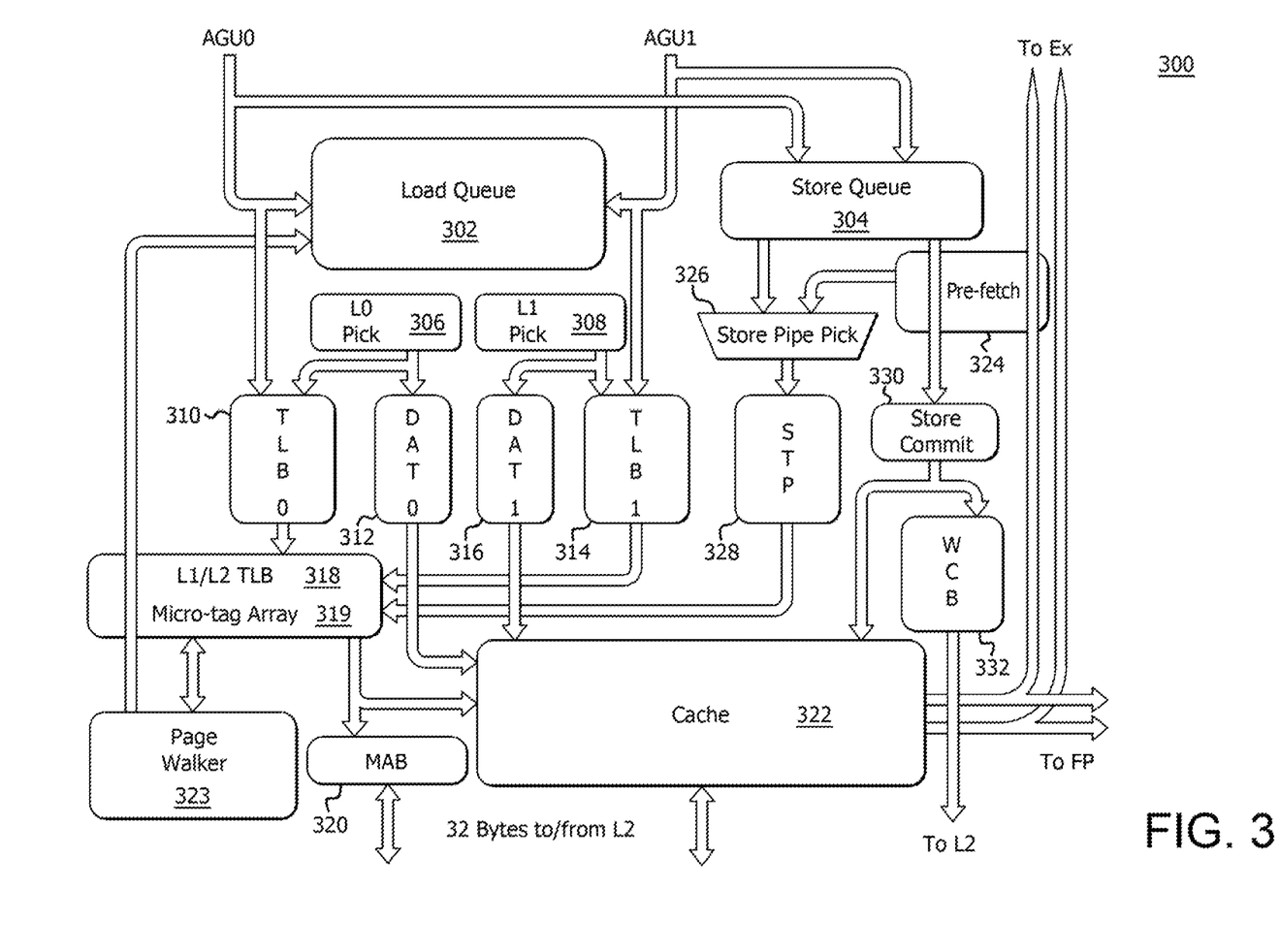
FIG. 3 is a high level block and flow diagram of a scheduler and/or execution unit in accordance with certain implementations.

FIG. 3 is a high level block and flow diagram of a load-store/data cache (LSDC) unit 300 in accordance with certain implementations. The LDSC unit 300 includes a LDQ 302, a STQ 304, a load 0 (L0) picker 306 and a load 1 (L1) picker 308. The L0 picker 306 is connected to a translation lookaside buffer (TLB) and micro-tag access pipeline 0 (TLB0) 310 and a data cache access pipeline (data pipe 0) 312. The L1 picker 308 is connected to a translation lookaside buffer (TLB) and micro-tag access pipeline 1 (TLB1) 314 and a data cache access pipeline (data pipe 1) 316. The TLB0 310 and TLB1 314 are further connected to L1/L2 TLB 318, a page walker 323, and micro-tag array 319, which in turn is connected to a miss address buffer (MAB) 320, and assists in reading data from a cache 322. The data pipe 0 312 and data pipe 1 316 are connected to the cache 322. The STQ 304 is connected to a pre-fetcher 324 and a store pipe picker 326, which in turn is connected to a store pipeline (STP) 328. The STP 328 is also connected to the L1/L2 TLB 318 and the micro-tag array 319. The STQ 304 is further connected to a store commit pipeline 330, which in turn is connected to a write combining buffer (WCB) 332 and the cache 322.

Once address generation is performed by the AGSQs and the dispatch payload are held in the LDQs 302 and STQs 304 as appropriate, the LDSC 300 executes the micro-ops. In an illustrative example, when a load micro-op is picked (such as at L0 picker 306 or L1 picker 308), the load micro-op uses the respective TLB 0 310 or TLB 1 314 pipelines to check the respective TLB 0 310 or TLB 1 314 pipelines for a translation and a predicted data cache way for the load micro-op. The load micro-op also checks the cache 322 via data pipe 0 312 and data pipe 1 316, respectively. In certain implementations, micro-tag array 319 allows a micro-op to determine a predicted data cache way prior to confirming the way by comparing with the full tags. The page walker 323 is used to determine the physical address of the micro-op. In another illustrative example, the pre-fetcher 324 is used to populate lines in the cache 322 prior to a request being sent to the cache 322.

Figure 4:
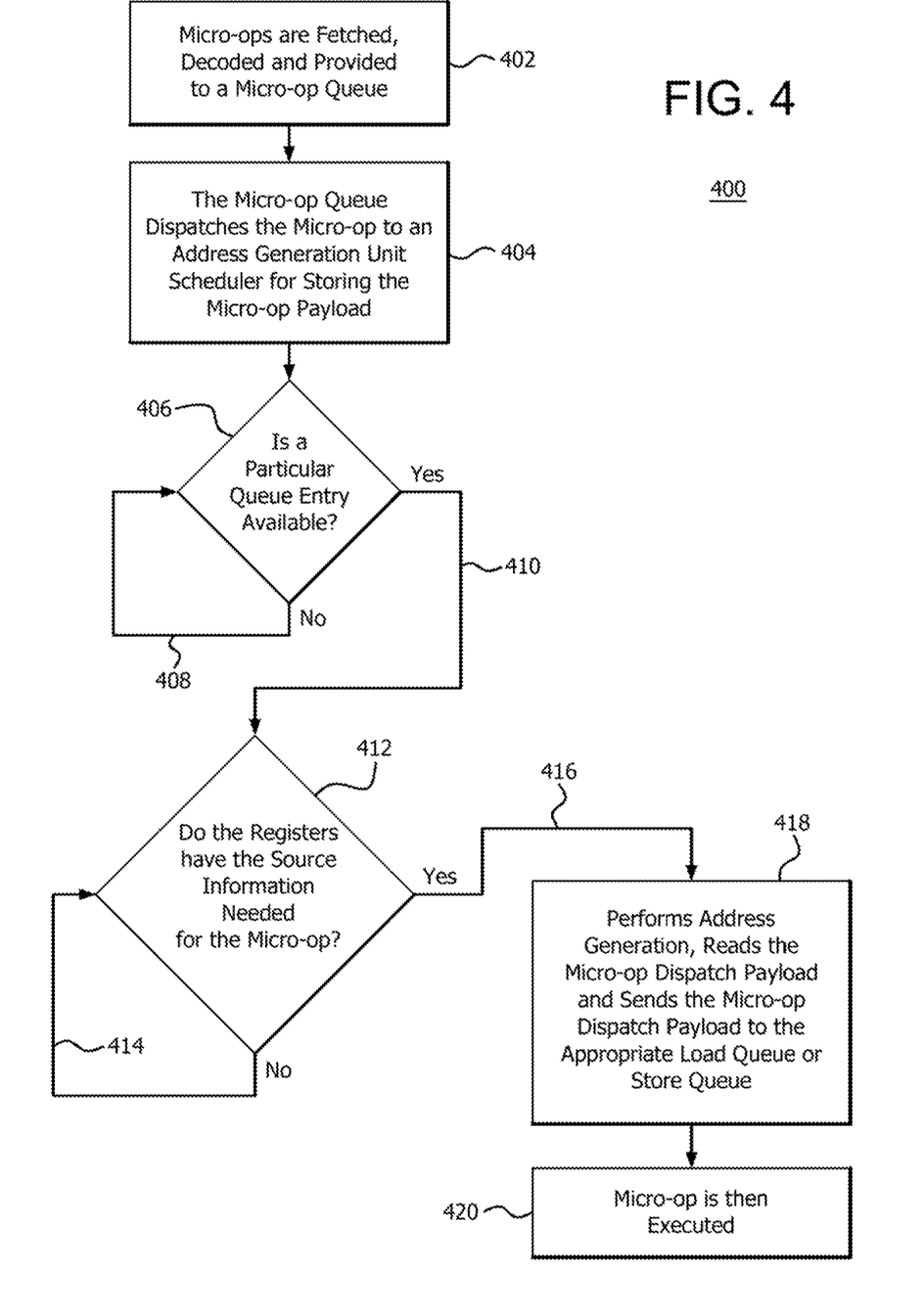
FIG. 4 is a flow diagram of a method for load and store queue allocations at address generation time in accordance with certain implementations.

FIG. 4 is a flow diagram 400 of a method for load and store queue allocations at address generation time in accordance with certain implementations. Micro-ops are fetched, decoded and provided to a micro-op queue (step 402). The micro-op queue dispatches the micro-op to an address generation unit scheduler for storing the micro-op dispatch payload (step 404). The dispatching is done to maintain age-order or program order. The address generation unit scheduler determines from information sent by a load queue or a store queue if a particular (i.e., age-ordered) queue entry is available (step 406). If the particular queue entry is not available, the address generation unit scheduler maintains status quo and checks again (step 408).

If the particular queue entry is available (step 410), then the address generation unit scheduler determines if the source information needed for the micro-op is ready (step 412). If the source information is not ready, the address generation unit scheduler maintains status quo and checks again (step 414). If the source information is ready (step 416), the address generation unit scheduler performs address generation, reads the micro-op dispatch payload and sends the micro-op dispatch payload to the appropriate load queue or store queue (step 418). The micro-op is then executed (step 420). The order of operations is illustrative only and other orders can be used.

Figure 5:
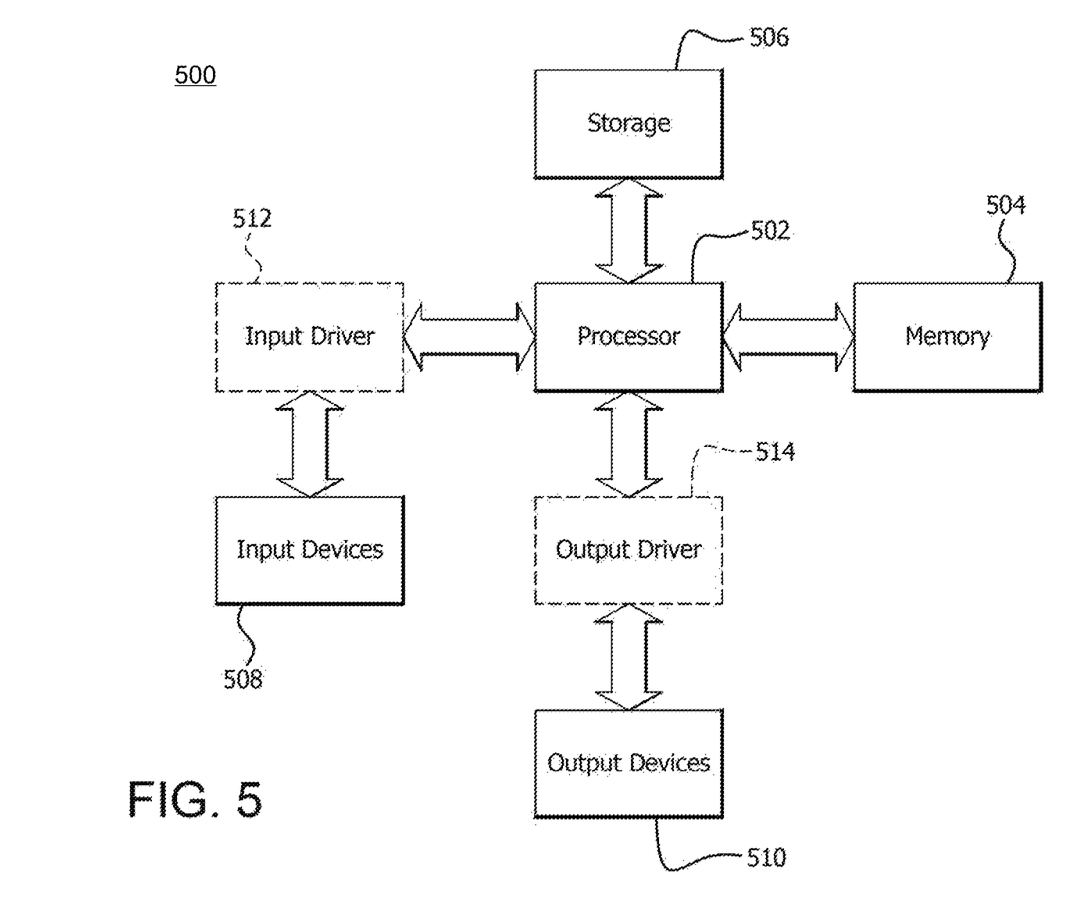
FIG. 5 is a block diagram of an example device in which one or more disclosed implementations may be implemented.

FIG. 5 is a block diagram of an example device 500 in which one or more portions of one or more disclosed examples are implemented. The device 500 includes, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 also optionally includes an input driver 512 and an output driver 514. It is understood that the device 500 includes additional components not shown in FIG. 5.

The compute node or processor 502 includes a central processing unit (CPU), a graphics processing unit (GPU), a CPU and GPU located on the same die, or one or more processor cores, wherein each processor core may be a CPU or a GPU. The memory 504 is located on the same die as the compute node or processor 502, or is located separately from the compute node or processor 502. In an implementation, the memory 504 includes a volatile or non-volatile memory, for example, random access memory (RAM), dynamic RAM, or a cache.

The storage 506 includes a fixed or removable storage, for example, a hard disk drive, a solid state drive, an optical disk, or a flash drive. The input devices 508 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In an implementation, a method for processing micro-operations fetches micro-operations and dispatches the micro-operations to an age-ordered scheduler queue. The age-ordered scheduler queue holds a dispatch payload associated with each micro-operation. The method then performs address generation for a micro-operation on a condition that an associated queue entry in a queue is available and source information needed for the micro-operation is ready. The dispatch payload of the micro-operation is read and sent to the queue. In an implementation, the method further associates, at dispatch, each micro-operation with a queue entry in the queue in program order to maintain age-order. In an implementation, the method further updates an oldest uncommitted micro-operation queue entry based on input from the queue. In an implementation, the method further compares, at the age-ordered scheduler queue, the oldest uncommitted micro-operation queue entry to queue entries for each of the micro-operations to determine if the micro-operation's queue entry is available. In an implementation, the micro-operation is a store micro-operation. In an implementation, the dispatch window size is a depth of the queue and a depth of the age-ordered scheduler queue. In an implementation, wrap bits are used to track different epochs of the queue to enable dispatching more than the depth of the queue.

In an implementation, a processor for processing micro-operations includes a queue, an age-ordered scheduler queue and a decoder. The decoder dispatches micro-operations to the age-ordered scheduler queue. The age-ordered scheduler queue holds a dispatch payload associated with each micro-operation, performs address generation for a micro-operation on a condition that an associated queue entry in the queue is available and source information needed for the micro-operation is ready, reads the dispatch payload of the micro-operation, and sends the dispatch payload to the queue. In an implementation, the decoder associates each micro-operation with a queue entry in the queue in program order to maintain age-order. In an implementation, the queue notifies the age-ordered scheduler queue that the associated queue entry is available. In an implementation, the scheduler updates an oldest uncommitted micro-operation queue entry based on input from the queue, and compares an oldest uncommitted micro-operation queue entry to queue entries for each of the micro-operations to determine if the micro-operation's queue entry is available. In an implementation, the micro-operation is a store micro-operation. In an implementation, a dispatch window size is a depth of the queue and a depth of the age-ordered scheduler queue. In an implementation, wrap bits are used to track different epochs of the queue to enable dispatching more than the depth of the queue.

In an implementation, a method for processing micro-operations dispatches micro-operations to a scheduler queue for holding a dispatch payload associated with each micro-operation and performs address generation for a micro-operation having an available associated queue entry and having source information ready for the micro-operation. The method then reads a dispatch payload of the micro-operation and sends the dispatch payload of the micro-operation to a queue. In an implementation, the method further assigns queue entry in program order to each micro-operation to maintain age-order. In an implementation, the method further updates an oldest uncommitted micro-operation queue entry. In an implementation, the method further compares, at the scheduler queue, the oldest uncommitted micro-operation queue entry to queue entries for each of the micro-operations to determine if the micro-operation's queue entry is available. In an implementation, a dispatch window size is a depth of the queue and a depth of the scheduler queue. In an implementation, wrap bits are used to track different epochs of the queue to enable dispatching more than the depth of the queue.

In an implementation, a computer readable non-transitory medium including instructions which when executed in a processing system cause the processing system to execute a method for load and store allocations at address generation time. The method fetches micro-operations and dispatches the micro-operations to an age-ordered scheduler queue. The age-ordered scheduler queue holds a dispatch payload associated with each micro-operation. The method then performs address generation for a micro-operation on a condition that an associated queue entry in a queue is available and source information needed for the micro-operation is ready. The dispatch payload of the micro-operation is read and sent to the queue. In an implementation, the method further associates, at dispatch, each micro-operation with a queue entry in the queue in program order to maintain age-order. In an implementation, the method further updates an oldest uncommitted micro-operation queue entry based on input from the queue. In an implementation, the method further compares, at the age-ordered scheduler queue, the oldest uncommitted micro-operation queue entry to queue entries for each of the micro-operations to determine if the micro-operation's queue entry is available. In an implementation, the micro-operation is a store micro-operation. In an implementation, the dispatch window size is a depth of the queue and a depth of the age-ordered scheduler queue. In an implementation, wrap bits are used to track different epochs of the queue to enable dispatching more than the depth of the queue.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing micro-operations, the method comprising:
   fetching a plurality of micro-operations, wherein the plurality of micro-operations includes a first micro-operation;
   in response to a queue entry in a load/store queue not being available for the first micro-operation, dispatching the first micro-operation to an age-ordered scheduler queue without dispatching the first micro-operation to the load/store queue, wherein the age-ordered scheduler queue holds a dispatch payload associated with the first micro-operation; and
   in response to a queue entry in the load/store queue identified by the first micro-operation becoming available and source information required by the first micro-operation becoming ready:
      performing address generation for the first micro-operation;
      reading the dispatch payload including the first micro-operation; and
      sending the dispatch payload including data to be stored as specified by the first micro-operation to the available queue entry identified by the first micro-operation in the load/store queue.

2. The method of claim 1, further comprising:
   associating, at dispatch time, each micro-operation with a queue entry in the load/store queue in program order to maintain age-order.

3. The method of claim 1, further comprising:
   updating an oldest uncommitted micro-operation queue entry number based on input from the load/store queue.

4. The method of claim 3, further comprising:
   comparing the oldest uncommitted micro-operation queue entry to one or more associated load/store queue entries for each of the micro-operations to determine if the micro-operation's queue entry is available.

5. The method of claim 3, wherein the micro-operation is a store micro-operation.

6. The method of claim 1, wherein a dispatch window size is based on a depth of the load/store queue.

7. The method of claim 1, wherein different epochs of the load/store queue are tracked to enable dispatching more than a depth of the load/store queue, wherein each epoch represents a cycle of the load/store queue.

8. The method of claim 1, further comprising:
   fetching a plurality of micro-operations, wherein the plurality of micro-operations includes a second micro-operation;
   in response to a queue entry in the load/store queue being available for the second micro-operation:
   performing address generation for the second micro-operation;
   reading the dispatch payload including the second micro-operation; and
   sending the dispatch payload including data to be stored as specified by the second micro-operation to the available queue entry identified by the second micro-operation in the load/store queue.

9. A processor for processing micro-operations, comprising:
   a load/store queue;
   an age-ordered scheduler queue;
   an address generation scheduler; and
   a decoder,
   wherein:
      the decoder is configured to fetch a plurality of micro-operations, wherein the plurality of micro-operations includes a first micro-operation;
      in response to a queue entry in a load/store queue not being available for the first micro-operation, the decoder is configured to dispatch the first micro-operation to the age-ordered scheduler queue without dispatching the first micro-operation to the load/store queue;
      the age-ordered scheduler queue configured to hold a dispatch payload associated with the first micro-operation; and
      the address generation scheduler is configured to determine a queue entry in the load/store queue identified by the first micro-operation becoming available and source information required by the first micro-operation becoming ready,
      in response to the address generation scheduler determining that the queue entry in the load/store queue identified by the first micro-operation becoming available and the source information required by the first micro-operation becoming ready, the address generation scheduler is further configured to:
   perform address generation for the first micro-operation,
   read the dispatch payload including the first micro-operation, and send the dispatch payload including data to be stored as specified by the first micro-operation to the available queue entry identified by the first micro-operation in the load/store queue.

10. The processor of claim 9, wherein the decoder is further configured to associate each micro-operation with a queue entry in the load/store queue in program order to maintain age-order of the micro-operations.

11. The processor of claim 10, wherein the load/store queue is configured to notify the age-ordered scheduler queue that the associated queue entry is available.

12. The processor of claim 9, wherein the scheduler is configured to:
update an oldest uncommitted micro-operation queue entry number based on input from the load/store queue; and
compare an oldest uncommitted micro-operation queue entry to one or more associated load/store queue entries for each of the micro-operations to determine if the micro-operation's queue entry is available.

13. The processor of claim 9, wherein the micro-operation is a store micro-operation.

14. The processor of claim 9, wherein a dispatch window size is based on at least one of a depth of the load/store queue and a depth of the age-ordered scheduler queue.

15. The processor of claim 9, wherein different epochs of the load/store queue are tracked to enable dispatching more than a depth of the load/store queue, each epoch represents a cycle of the load/store queue.

16. The processor of claim 10:
wherein the decoder is configured to fetch a plurality of micro-operations, wherein the plurality of micro-operations includes a second micro-operation;
in response to the address generation scheduler determining that the queue entry in the load/store queue identified by the second micro-operation becoming available and the source information required by the second micro-operation becoming ready, the address generation scheduler is further configured to:
perform address generation for the second micro-operation,
read the dispatch payload including the second micro-operation, and
send the dispatch payload including data to be stored as specified by the second micro-operation to the available queue entry identified by the second micro-operation in the load/store queue.

17. A method for processing micro-operations, the method comprising:
in response to a queue entry in a load/store queue not being available for a first micro-operation, dispatching the first micro-operation to a scheduler queue for holding a dispatch payload associated with a plurality of micro-operations without dispatching the first micro-operation to the load/store queue, wherein the plurality of micro-operations include a first micro-operation;
storing the dispatch payload in the scheduler queue;
determining whether a queue entry in the load/store queue identified by the first micro-operation is available and whether source information required by the first micro-operation is ready; and
in response to the queue entry in the load/store queue becoming available and source information required by the first micro-operation becoming ready:
performing address generation for the first micro-operation;
reading the dispatch payload including the first micro-operation; and
sending the dispatch payload including data to be stored as specified by the first micro-operation to the available queue entry identified by the first micro-operation in the load/store queue.

18. The method of claim 17, further comprising:
assigning a queue entry in program order to each micro-operation to maintain age-order.

19. The method of claim 17, further comprising:
updating an oldest uncommitted micro-operation queue entry number based on input from the load/store queue.

20. The method of claim 19, further comprising:
comparing the oldest uncommitted micro-operation queue entry to one or more associated load/store queue entries for each of the micro-operations to determine if the micro-operation's queue entry is available.

21. The method of claim 17, wherein a dispatch window size is based on a depth of the load/store queue.

22. The method of claim 17, wherein different epochs of the load/store queue are tracked to enable dispatching more than a depth of the load/store queue, wherein each epoch represents a cycle of the load/store queue.

23. The method of claim 17, further comprising:
fetching a plurality of micro-operations, wherein the plurality of micro-operations includes a second micro-operation;
in response to a queue entry in the load/store queue being available for the second micro-operation:
performing address generation for the second micro-operation;
reading the dispatch payload including the second micro-operation; and
sending the dispatch payload including data to be stored as specified by the second micro-operation to the available queue entry identified by the second micro-operation in the load/store queue.

* * * * *